Jan. 5, 1965              J. HICKS IV              3,164,772
PORTABLE MEANS FOR REPELLING SHARKS UTILIZING PULSE
DISCHARGES THROUGH A DIPOLE ANTENNA
Filed Jan. 24, 1962                               2 Sheets-Sheet 1
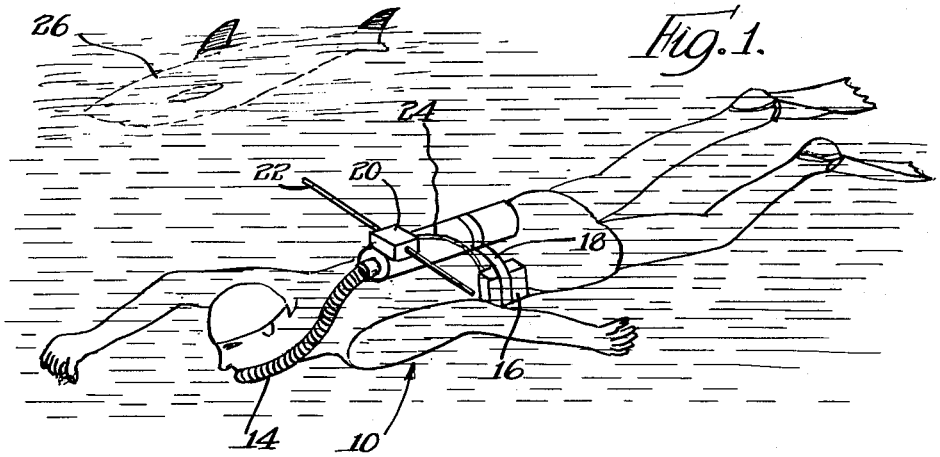
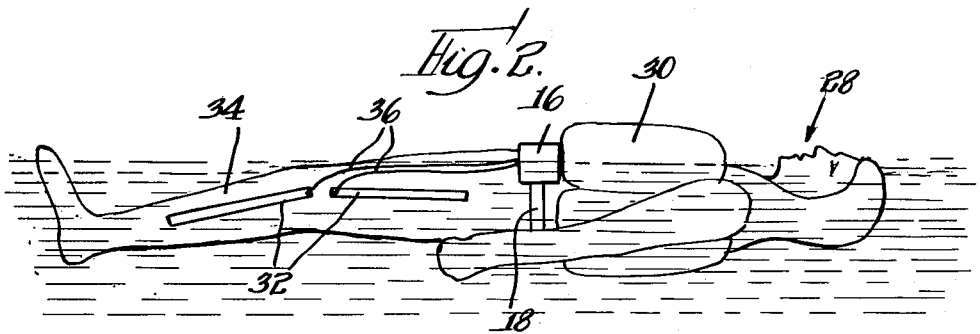
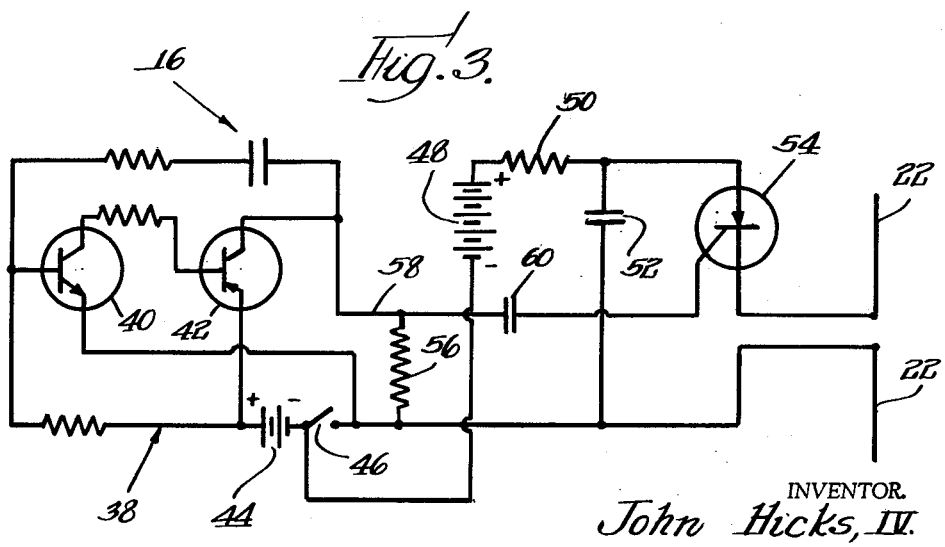
INVENTOR.
John Hicks, IV.

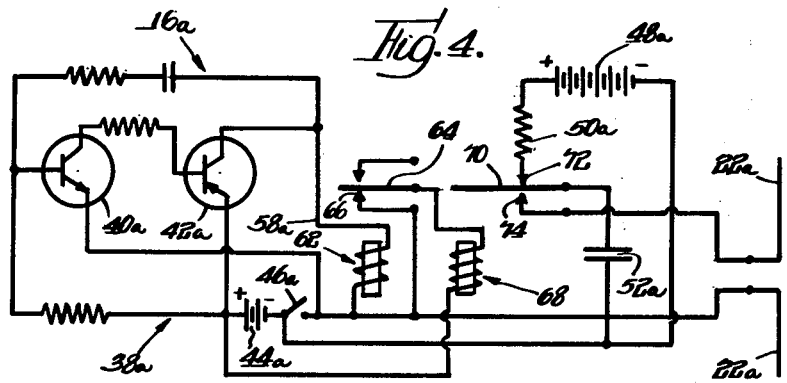
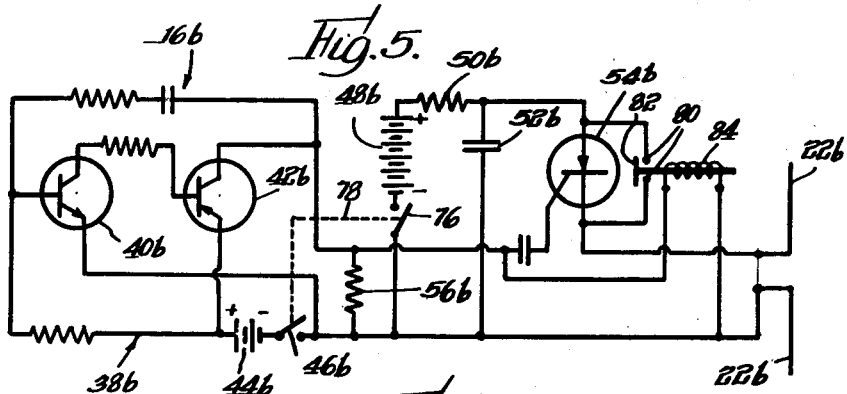
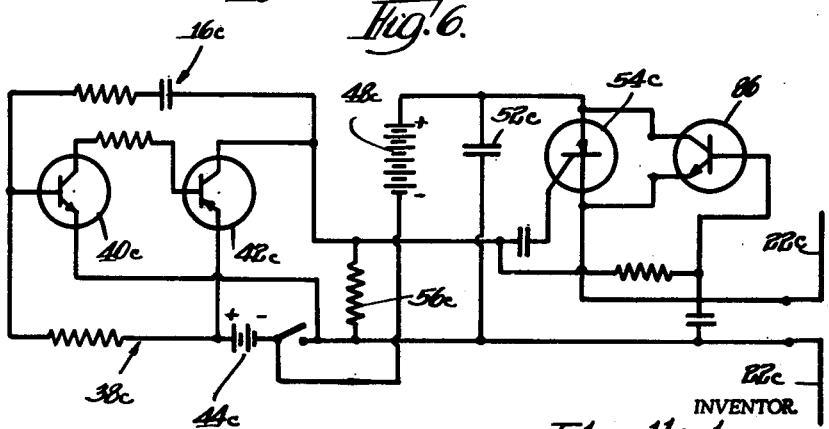

3,164,772
PORTABLE MEANS FOR REPELLING SHARKS UTILIZING PULSE DISCHARGES THROUGH A DIPOLE ANTENNA
John Hicks IV, Fairfax, Va., assignor to
Phillips E. Hicks, Fairfax, Va.
Filed Jan. 24, 1962, Ser. No. 168,442
9 Claims. (Cl. 325—118)

This invention relates to methods and apparatus for repelling sharks and the like.

Efforts to repel sharks, or at least to hold them at bay, heretofore have consisted mostly of chemicals deposited in the water. Such chemicals have not as yet proved entirely satisfactory.

It is an object of this invention to provide electronic means and methods for repelling sharks.

I am aware that efforts have been made heretofore to control movement of fish and other aquatic life through electrically charged areas in the water. Prior art screens of this nature have consisted of two electrodes, often in the form of grids or meshes, spaced apart a relatively short distance. Oscillating current of one sort or another has been connected oppositely to the two electrodes, and the area between the electrodes has been charged electrically at the oscillating frequency. Fish and other aquatic animals and the like have been supposed to stay out of the charged zone.

There are at least two things wrong with such prior art electronic systems as related to repelling sharks. In the first place, such prior art have been largely limited in use to fresh water. Salt water is so highly conductive as to render the devices inoperative, simply short circuiting the electrodes. Since sharks are found only in salt water, such prior art devices are obviously useless when it comes to repelling sharks. Furthermore, any living body in the charged water zone of such prior art devices receives a rather substantial shock. By actual tests, a man cannot stay in such a charged zone. Substantially the only time that it really is necessary to repel sharks is when a man is floating in the water, as with a life jacket, when diving, or when a person is on a rather small life raft. Obviously, if there were an electrified zone in the water sufficient to repel fish or other aquatic life in accordance with the prior art teachings, then it would not be possible for a man to remain in this zone to be protected from the aquatic life.

As reported from time to time in the public press, sharks have been found recently in ever-increasing numbers farther and farther north than heretofore. Furthermore, with constantly increasing leisure time, more people are engaged in pleasure boating, swimming and water skiing. The combination of these factors makes the problem of protection from sharks more important than ever. Similarly, orbiting or other carrying of men in space vehicles generally results in the passengers being dropped in the water. Such landings generally are in tropical waters where sharks abound.

It is not always desirable to repel fish of other species along with sharks. For example, someone floating in a life raft might want to catch fish to eat, while still keeping sharks at a safe distance. Furthermore, it is said that porpoises will sometimes push a floating body in towards shore, and this might very well be desirable for a person floating in the water.

Accordingly, it is an object of this invention selectively to repel sharks and certain other types of aquatic life, without repelling fish of most species.

In particular, it is an object of this invention to provide means and methods for repetitively discharging electronic charges into salt water to repel sharks.

More specifically, it is an object of this invention to utilize a dipole antenna for disbursing repetitive electronic discharges into salt water.

Other and further objects and advantages of the present invention will be apparent from the following description when taken in connection with the accompanying drawings wherein:

FIG. 1 shows one embodiment of the invention, as used by a skin diver, for example;

FIG. 2 shows a modification of the invention, such as might be used by an astronaut;

FIG. 3 is a schematic wiring diagram of one form of the invention;

FIG. 4 is a schematic wiring diagram illustrating a modification of FIG. 3 utilizing relays as opposed to the silicon controlled rectifier of FIG. 3;

FIG. 5 is a schematic wiring diagram similar to FIG. 3 but incorporating a relay turn-off control; and FIG. 6 is a schematic wiring diagram generally similar to FIG. 5, but utilizing a transistor turn-off control.

Much of the present invention apparently defies logic. Certain things work that on the face of it should not work. Accordingly, consideration of certain aspects of the invention and of certain characteristics of sharks are believed to be in order before attention is directed to examples of the invention.

In accordance with the principles of this invention, a capacitor is repetitively discharged to a small dipole antenna in the water. The antenna may be carried on a raft, or it may be carried directly on a man. Through experiments, it has been established that this will repel sharks at a distance of 20 to 30 feet. A hungry shark can be within striking distance of meat, or can actually have seized upon the meat before the repeller of the present invention is turned on, and the shark will quickly swim away, releasing the meat if it has already grasped it. Dipole antennae measuring a distance of eight inches tip-to-tip on up to two feet tip-to-tip have been found effective. Such antennae in sea water typically present a low resistance which has been measured as about 200 ohms. On the face of it, this would amount substantially to a short circuit, and all of the current would be conducted almost directly between the halves of the dipole. Certainly, no electrical effect would be expected 20 to 30 feet away. Attempted measurements by oscilloscope, or detection by earphones at 20 to 30 feet have revealed no electrical reaction whatsoever at this distance. No electrical shock can be felt by a person in the water holding the dipole antenna. Nevertheless, sharks are repelled at 20 to 30 feet. It may be concluded that it is not voltage that is repelling the sharks.

Conversely, it has been found that most species of fish will swim in close proximity to the dipole antenna. This reinforces the conclusion that it is not voltage that is repelling sharks. Accordingly, it is thought helpful to direct attention to certain rather unusual characteristics of sharks.

Sharks are very primitive aquatic creatures, perhaps being millions of years older than most species of fish. In fact, many experts draw a distinction, and assert that sharks are not truly fish, but are a different species of aquatic life. A shark has no air bladder, and has no gills as such and no bony structure—it is primarily cartilage. A shark takes in water through two holes in its head and through its mouth and expels it through openings in the neighborhood of the jaw. The latter accounts for the typical open-mouth approach of a shark when it is very active. The oxygen exchange system is in the head near the brain. Some of the nerve ends are exposed in the shark's head, such as in the lips, giving very sensitive detection. A shark can detect bubbles, or the vibrations resulting therefrom, rising from blood dropped in the sea from quite a substantial distance. It is believed that the sense of smell of a shark is so developed that once it has been brought within about 100 feet by such nerve detection, the shark will smell the blood.

More specifically, a shark is provided with what are known as "the ampullae of Lorenzini." These ampullae are a complex system of sensory vesicles found under the skin of heads of sharks where the sharks receive stimuli through the water for conveyance direct to the brain over the facial and trigeminal nerves. The latter also contain motor elements supplying muscles of the jaw. It has been observed that the jaws of a shark are unusually active when in the vicinity of my electronic repeller, and it is very likely that this is due to overstimulation of the ampullae.

The shark has a related sense organ system, also in contact with the outside water through pores, which consists in the so-called lateral line canal organ which runs the length of the body on either side, and is supplied with branches of the vagus nerve from the brain. This nerve is made up of visceral as well as sensory components, and has connections not only with the sense organs of the lateral line, but with the musculature of the alimentary tract as well. It may well be that this nerve is stimulated, as spasmodic flexion and regurgitation reflexes have been observed in sharks exposed to my electronic repeller. It is believed that the lateral line organs of a shark are normally used in pressure (vertical orientation) and vibration detection.

The foregoing is set forth by way of suggestion, and not necessarily as a complete and correct explanation. Obviously, this is somewhat theoretical in nature when one discusses explanations of observed reactions. However, the reactions have been observed, and from this is known that if a shark is allowed to approach one of my electronic repellers, and the repeller is then turned on, the shark's heart and gills stop when this is turned on. At this point, the term "gills" is used rather loosely, in view of the previous statement that sharks have no gills as such. However, the openings in the jaw open and shut with the frequency of the electronic discharge. It is believed that this interferes with the natural timing of the shark's nervous system, and it has been observed that it will kill a shark in rather short order, for example, a small nurse shark has been killed in 20 seconds when it was restrained against leaving the area of the repeller under test. Larger sharks are repelled more quickly than the nurse shark, and it is felt that they will be killed even more quickly. Obviously, the repelling or killing is not in the form of an electrical shock, since a man can be standing or floating in the water carrying the unit, including the antenna which sends the signal into the water, without damage, danger or shock to himself.

Reference now should be had to FIG. 1, wherein a swimmer 10 is shown dressed in rather rudimentary skin diving equipment, including an air tank 12 and oral breathing apparatus 14. A repeller 16 constructed in accordance with the principles of this invention is secured to the person of the swimmer 10 as by a belt 18, which may also secure the air tank 12. An insulating fixture 20 is mounted on the air tank 12 and carries the two halves of the dipole antenna 22 in oppositely extending relation. The two halves of the dipole are conventionally connected to the repeller 16 by means of wires, such as a twin-lead 24. When a skin diver is so equipped, it has been observed that a shark, shown at 26, will not come within several feet of the skin diver. The distance which the shark will remain away depends on a variety of factors, including the size of a dipole, the size of the capacitor discharged in the repeller 16, and the voltage applied to the capacitor. However, even an eight-inch dipole, and relatively low voltages and capacity will maintain a shark six to seven feet away, while a longer dipole, conveniently foldable in conventional fashion, will hold sharks twenty to thirty feet away, particularly in combination with higher value of capacitors and higher voltages. However, at this point, it should be observed that the voltages never need be high enough (and preferably are always supplied from a rather small capacity battery) to cause any discomfort to the swimmer 10, or other party using the device.

In FIG. 2, a modification of the invention is used such as might be carried or worn by an astronaut, depicted at 28, and wearing conventional garb for an astronaut, including a life jacket 30. The repeller 16 again conveniently is held to the man's waist by a belt 18. However, in this instance, a dipole antenna 32 consists of two flexible strips secured to the man's pants 34, with the midpart of the antenna being substantially at the knee. The strips 32 may be of conductive tape, adhesively secured to the pants, or may be of metal braid sewed in place. The important thing is that the two arms of the dipole antenna are flexible so as to cause no impediment to movement or comfort of the wearer. When the knee is straightened, the two halves of the dipole extend substantially oppositely of one another. The two dipole antenna halves 32 are secured by wires 36 to the repeller 16 for conduction of electrical energy from the repeller to the dipole.

One suitable circuit for the repeller 16 is shown in FIG. 3, and includes an astable multivibrator 38 employing two transistors 40 and 42, and conventional connecting circuitry. A relatively low voltage battery 44 is provided of suitable potential for operating transistors, and may, for example, be on the order of 6 to 9 volts. An on-off switch 46 is provided immediately adjacent the battery 44. The switch functions to connect the battery to the transistors 40 and 42 whereby when the switch is closed, the astable multivibrator will operate, serving as a timing device and generator.

In addition, there is a relatively high voltage battery 48. This battery may be quite small in capacity, and may be of a type frequently used as a "B" battery in portable radios, weighing only a few ounces, and having a maximum dimension on the order of a few inches, other dimensions generally being less than an inch. This battery may have a potential on the order of 100 to 150 volts. It is connected through a switch 46 and a charging resistor 50 to a capacitor 52. One side of the capacitor is connected to a silicon controlled rectifier 54, the output side of which is connected to one half of a dipole antenna, for example, the dipole antenna 22. The opposite side of the capacitor 52 is connected directly to the opposite side of the dipole 22.

A biasing resistor 56 is connected adjacent the switch 46, and to an output line 58 from the timing generator 38. The line 58 leads through a capacitor 60 to the silicon controlled rectifier 54.

As will be apparent to those skilled in the electronic arts, the capacitor 52 is charged by the battery 48. The timing device or generator 38 oscillates at a predetermined desired frequency, producing a square wave output, whereby periodically to turn the silicon controlled rectifier 54 "on" and "off," whereby the capacitor 52 is periodically discharged through the silicon controlled rectifier 54 to the dipole antenna 22, the energy being discharged into the sea. As it will be apparent, the resistor 50 prevents the battery 48 from being effectively short circuited during discharge of the capacitor 52. Although the actual amount of power put out by the repeller is rather small, during discharge of the capacitor 52 about 1500 watts is produced instantaneously. This is sufficient so that when I have tried the device in fresh water, I have gotten quite a substantial shock, although no shock is discernible in sea water.

The silicon controlled rectifier 54 of FIG. 3 works very well, but it is at the present time very expensive. Accordingly, an alternate circuit is shown in FIG. 4, using electro-mechanical relays, which are relatively quite inexpensive. Many of the parts in FIG. 4 are similar to those of FIG. 3, and similar reference numerals are used with the addition of the suffix *a*. Thus, the repeller is identified generally by the numeral 16*a*, and a timing generator 38*a* is provided which is identical with the timing generator of FIG. 3. The output connection 58*a* is connected to a relay 62 comprising a generally conventional coil and core operable upon an armature 64 to close the armature against a fixed contact 66. The relay 62 is one that is quite sensitive but is of restricted power carrying capacity.

The fixed contact 66 is connected to one side of the battery 44*a* through the switch 46*a*, while the armature 64 is connected to one side of a power relay 68. The other side of the power relay is returned to the opposite side of the battery 44*a*.

The armature 70 attracted by the relay 68 is normally in engagement with an upper fixed contact 72. This fixed contact is connected to the charging resistor 50*a*, to the battery 48*a*, and hence to the capacitor 52*a*. The capacitor is returned to the armature 70.

When the relay 68 is energized, the armature 70 is pulled down into engagement with a lower fixed contact 74. This lower fixed contact is connected directly to one side of the dipole antenna 22*a*. The opposite side of the dipole antenna 22*a* is connected to the opposite or bottom side of the capacitor 52*a* through the switch 46*a*.

Operation of the device in FIG. 4 is similar to that of FIG. 3. The capacitor 52*a* is charged from the battery 48*a* through the resistor 50*a*, with the armature 70 engaging the upper fixed contact 72. When the timing generator 38*a* energizes the relay 62, the armature 70 is brought into engagement with the lower fixed contact 74, thereby disconnecting the battery 48*a* from the circuit, and discharging the capacitor 52*a* directly to the dipole antenna 22*a*.

A further modification of the invention is shown in FIG. 5, being in many respects identical with that of FIG. 3. Similar numerals again are used, this time with the addition of the suffix *b*. One distinction resides in control of the high voltage battery 48*b* through a switch 76, preferably ganged with the switch 46*b* as indicated by the dash line 78. Obviously, this switch could be separately operated if desired.

Contacts 80 and a shorting bar 82 operated by a solenoid 84 are provided across the silicon controlled rectifier 54*b* and act as a relay turn-off control for the current switch comprising the silicon controlled rectifier 54*b*.

A similar circuit is shown in FIG. 6, similar parts being identified by similar numerals with the addition of the suffix *c*. In this instance, a transistor 86 is connected across the silicon controlled rectifier 54*c* as a turn-off control.

A silicon controlled rectifier is something like a thyratron in that it will not conduct until triggered by a pulse. Also, when in the conducting state, it will not stop until the plate voltage falls to a very low value, or reverses in polarity from positive to negative. This latter case, of course, includes the use of A.C. voltage on the plate. In D.C. circuits, which we are concerned with, the voltage from the charged capacitor falls to zero, or nearly zero, in a fraction of a second. If this near zero state exists for over one hundred microseconds, or more, the stable non-conducting state returns and the device is ready to be triggered again by a positive pulse to the control electrode.

To be certain that this condition does in fact exist for the required one hundred microseconds, it is expedient to momentarily short circuit the plate to cathode with a relay (or switch) or a low impedance transistor circuit. While this zero, or near zero, condition exists, it is also necessary that the control electrode be zero or even a bit negative with respect to the cathode.

To rephrase the above, the silicon controlled rectifier is an electronic switch which is normally open and which can be closed by a low-powered, low-voltage, positive pulse on the control electrode. To return the switch to its normal open state, it is essential that the plate to cathode voltage be near zero or even negative for one hundred millionths of a second or more. One way to insure this is to momentarily short the plate to the cathode with a relay or magnetically operated switch. Another way is to shunt the plate to cathode with a low impedance transistor circuit. A third method is to place a series resistor between the battery and the capacitor to prevent the capacitor from recharging too quickly. While this latter method is less efficient, it has the advantage over the relay circuit inasmuch as no moving parts are required.

One advantage of using the silicon controlled rectifier is that it will not start the pulsing mode unless the antenna is actually in the water. In other words, unless the capacitor is being discharged through the sea water (low resistance circuit) the plate voltage remains positive and the control electrode has no control even though it continues to be pulsed by the timing generator. Thus, the operator cannot receive a series of shocks while the device is out of water even though the timing generator is turned "on." When the device is in the ocean, the wearer is protected by the low resistance of the salt water. In other words, the current passes through the path of least resistance and the resistance of the body is many times that of salt water. It is as though the wearer were protected with a metallic suit.

The battery 44 in each instance need be of sufficient potential to operate the accompanying transistors 40 and 42, and the transistor 86, when it is used. The voltage thus is dependent on the particular transistors used, but typically will be of some six to 12 volts, and I have found nine volts to be generally quite satisfactory.

The battery 48, etc., will produce useful results with a potential of as low as 12 volts. However, for best results, I have found that voltages on the order of 100 to about 200 volts are preferable. Ninety volts and 135 volts are the potentials of commonly available batteries and generally work quite satisfactorily. Higher voltages produce satisfactory results, but a law of diminishing returns sets in, and the range is not extended appreciably by increasing voltages much over 150 volts or certainly not much over 200 volts.

The value of the capacitor 52 is not too critical but typically is on the order of 100 to a few hundred microfarads. As will be apparent from FIGS. 1 and 2, the repeller itself is a relatively small, self-contained unit adapted to be secured to or carried on the person. Alternatively, it can be carried on a life raft. The unit conveniently takes a rectangular and waterproof box-like form with a maximum dimension on the order of several inches, and generally not over about a half foot.

Although the unit herein was designed specifically for repelling sharks, it has also been found to be effective on rays, crocodiles and alligators, and at least certain types of turtles. Rays are known to be quite similar to sharks insofar as their nervous systems are concerned, and it is thought that probably turtles, alligators and crocodiles have ampullae similar to those of a shark. Repelling of alligators and crocodiles electrically might seem to be somewhat surprising, since these creatures will pass through an ordinary "electric fence" designed to repel fish. Indeed, alligators have been known to walk right over fallen high tension wires without damage, with sparks flying.

The repelling of sharks has been attempted with a similar antenna and with direct current rather than the interrupted current or potential herein. No results whatsoever are produced. Straight alternating current also has been attempted. The conducting wides and the antenna tend to get rather hot without particularly good repelling of sharks. Thus, it is thought that a repeated D.C. potential is desirable or necessary. I have found a repetition rate of one to three pulses per second to be satisfactory.

Various antennae configurations have been tried. While others will work, the dipole works best and gives apparently a substantially uniform field in the water. As noted heretofore, although sharks and the like are repelled quite effectively, other species of fish are affected little, if at all, and will swim up to the immediate vicinity of the antenna.

In the ensuing claims, reference is made to a "body" floating in sea water. It is to be understood that the word "body" contemplates a small life raft or the like as well as the body of a person, and that the body might float on the surface, or beneath the surface, as a skin diver, for example.

Although certain specific examples of my invention have been set forth herein, it will be understood that these are illustrative only. Various changes will no doubt occur to those skilled in the art, and will be understood as forming a part of the present invention insofar as they fall within the spirit and scope of the appended claims.

I claim:

1. In combination with a body of sea water, portable apparatus for repelling sharks and the like comprising an antenna adapted to be immersed in sea water in contact therewith, means for securing said antenna in exposed position to a body to be floated in sea water, and a small self-contained unit, means for securing said unit to a body to be floated in sea water with said antenna immersed, said unit including a capacitor, a battery, means for charging said capacitor from said battery, and means for periodically discharging said capacitor to said antenna.

2. Apparatus for repelling sharks and the like as set forth in claim 1, wherein the antenna comprises a dipole antenna.

3. Apparatus for repelling sharks and the like as set forth in claim 2, wherein the dipole antenna has a tip-to-tip length on the order of substantially eight inches to substantially twenty-four inches.

4. Apparatus for repelling sharks and the like as set forth in claim 2, wherein the antenna comprises conductive strip means secured to the outer covering of a body to be floated in sea water.

5. In combination with a body of sea water, portable apparatus for repelling sharks and the like comprising antenna means adapted to be immersed in sea water, means for securing said antenna means to a body to be floated in sea water with said antenna means exposed to said sea water, and a small self-contained unit, means for securing said unit to a body to be floated in sea water with said antenna immersed, said unit including a capacitor, a battery having a potential in the range of substantially 100 to substantially 200 volts, means for charging said capacitor from said battery, and means for periodically discharging said capacitor to said antenna.

6. In combination with a body of sea water, portable apparatus for repelling sharks and the like comprising antenna means adapted to be immersed in sea water, means for securing said antenna means to a body to be floated in sea water, and a small self-contained unit, means for securing said unit to a body to be floated in sea water with said antenna immersed, said unit including capacitor means, battery means, means for charging said capacitor means from said battery means, and means for periodically discharging said capacitor means to said antenna means, said discharging means comprising an oscillator.

7. Apparatus for repelling sharks and the like as set forth in claim 6, wherein the discharging means further includes a relay for connecting said capacitor means to said antenna means.

8. Apparatus for repelling sharks and the like as set forth in claim 6, wherein the discharging means further includes a silicon controlled rectifier connecting the capacitor means to the antenna means.

9. The method of repelling sharks and the like which comprises securing a source of electric power, a capacitor and an antenna to a body to be floated in sea water, floating said body in sea water with said antenna immersed in and exposed to said sea water, and charging said capacitor from said power source and repetitively discharging said capacitor to said antenna immersed in and exposed to sea water.

References Cited in the file of this patent

UNITED STATES PATENTS

| | | |
|---|---|---|
| 2,343,300 | Klumb | Mar. 7, 1944 |
| 2,426,037 | Mahoney et al. | Aug. 19, 1947 |
| 2,547,523 | Eicher | Apr. 3, 1951 |
| 2,605,742 | Burkey | Aug. 5, 1952 |
| 2,809,286 | Philpott et al. | Oct. 8, 1957 |
| 3,004,136 | Burnett | Oct. 3, 1961 |